United States Patent [19]

Wright et al.

[11] 4,111,806

[45] Sep. 5, 1978

[54] GRAVITATIONAL SEPARATOR FOR MIXTURES OF IMMISCIBLE LIQUIDS OF DIFFERENT DENSITIES

[75] Inventors: David A. Wright; Chester H. Walters, both of St. Louis, Mo.

[73] Assignee: National Marine Service, Inc., St. Louis, Mo.

[21] Appl. No.: 760,661

[22] Filed: Jan. 19, 1977

Related U.S. Application Data

[63] Continuation-in-part of Ser. No. 608,905, Aug. 29, 1975, Pat. No. 4,032,444.

[51] Int. Cl.² ............................................. B01D 12/00
[52] U.S. Cl. .................................... 210/115; 210/117; 210/296; 210/333 R; 210/513; 210/540
[58] Field of Search ............... 210/109, 115, 121, 123, 210/127, 295, 296, 337 A, 333 A, 338, 513, 538, 540, 117

[56] References Cited

U.S. PATENT DOCUMENTS

| | | | |
|---|---|---|---|
| 1,085,135 | 1/1914 | Kelly, Jr. | 210/540 X |
| 2,651,414 | 9/1953 | Lawson | 210/338 X |
| 2,755,936 | 7/1956 | Halpert | 210/338 X |
| 2,872,935 | 2/1959 | Kenney | 210/104 X |
| 3,297,161 | 1/1967 | Kasten | 210/115 X |
| 3,425,556 | 2/1969 | Völker | 210/104 |
| 3,628,660 | 12/1971 | in 'Veld | 210/104 |
| 3,762,548 | 10/1973 | McCabe | 210/540 X |
| 3,864,437 | 2/1975 | Blaszkowski | 261/91 X |
| 3,957,638 | 5/1976 | in 'Veld | 210/104 |
| 3,977,975 | 8/1976 | Geurtsen | 210/540 X |

*Primary Examiner*—William A. Cuchlinski, Jr.
*Attorney, Agent, or Firm*—Bacon & Thomas

[57] ABSTRACT

An improved gravitational separator for mixtures of immiscible liquids of different densities, particularly oil and water, includes a reaction member in the form of a dome or diaphragm immersed in more dense liquid to be separated and which floats upwardly in the more dense liquid under the influence of liquid of less density accumulated beneath the dome or diaphragm. A coalescer screen filter system is provided in the water outlet path in the separator, the coalescer screens being contained in a chamber provided with automatically operating, one-way, pressure responsive valves to ensure proper flow of water in a forward and backflush sense through the chamber. A flotation feature for the reaction member is provided, and the reaction member includes an auxiliary air chamber to prevent loss of a minimum desired residual layer of less dense fluid beneath the reaction member when air accumulates in this area. A specific inflow and outflow conduit arrangement is provided to minimize turbulence in the separator. An oil collection system is provided to carry backflushed oil from the coalescer to the inlet conduit of the separator.

19 Claims, 4 Drawing Figures

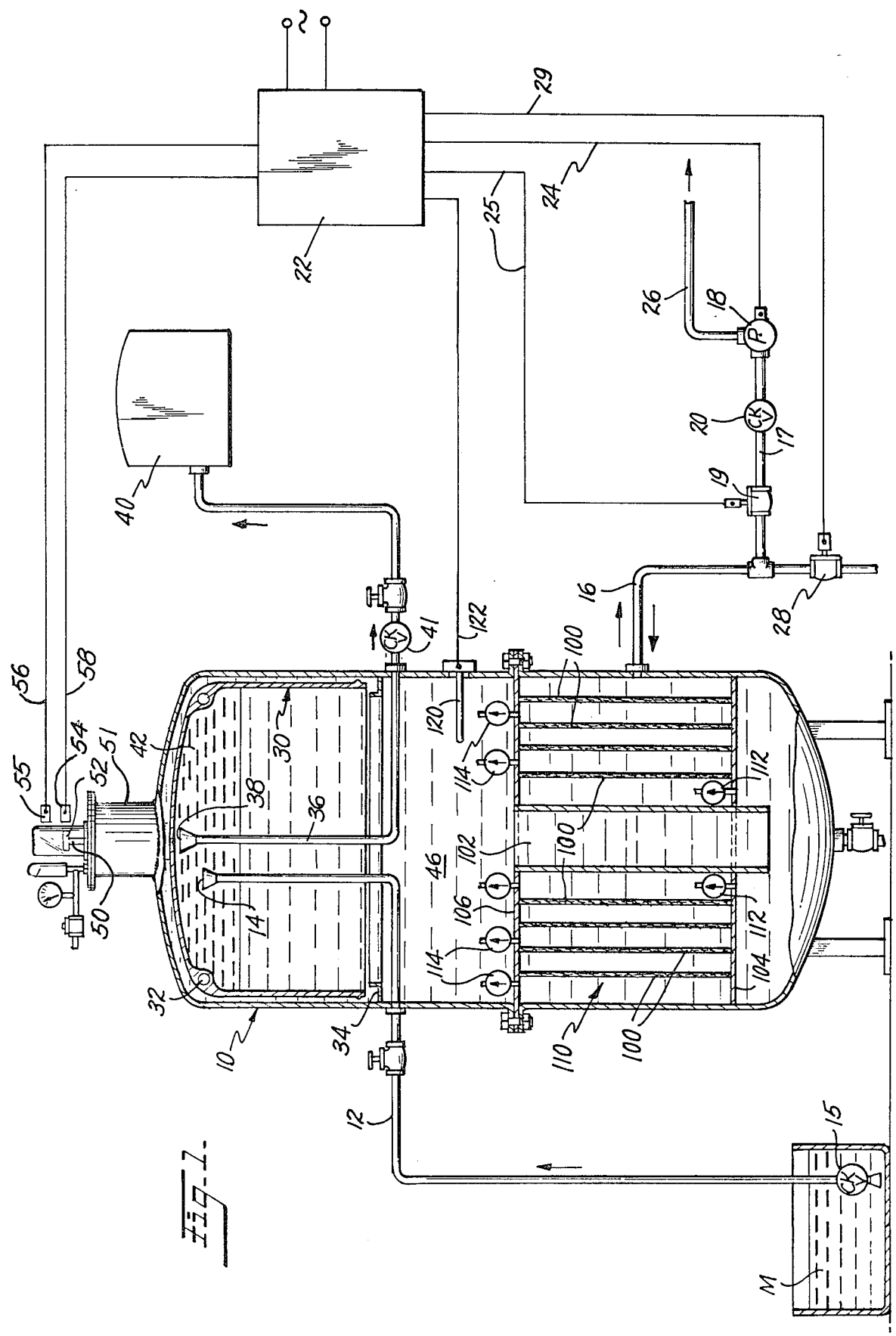

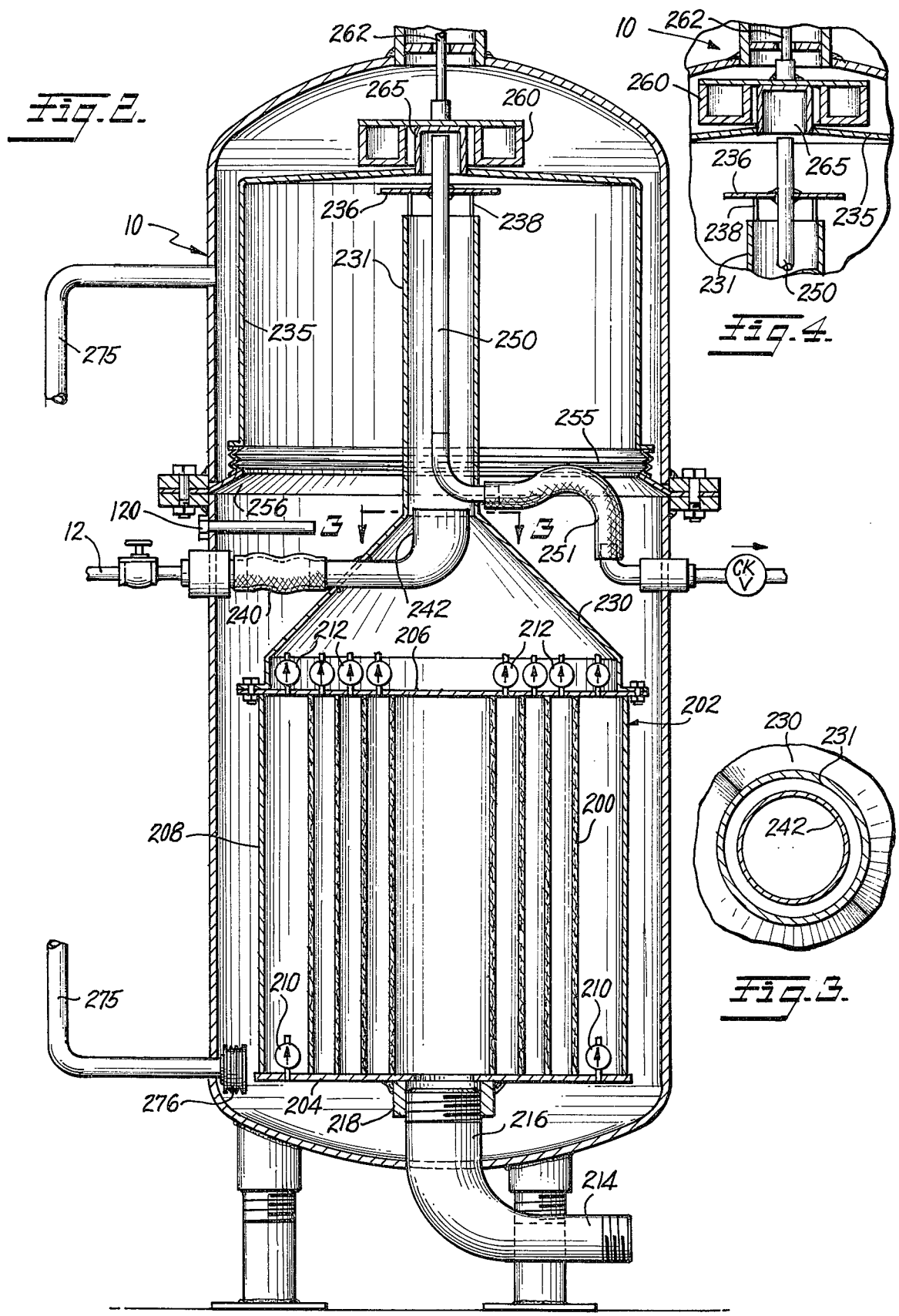

GRAVITATIONAL SEPARATOR FOR MIXTURES OF IMMISCIBLE LIQUIDS OF DIFFERENT DENSITIES

CROSS REFERENCE TO OTHER APPLICATIONS

This application is a continuation-in-part of our prior application Ser. No. 608,905 filed Aug. 29, 1975, now U.S. Pat. No. 4,032,444.

BACKGROUND OF THE INVENTION

The present invention relates to an improved form of gravity separator for mixtures of immiscible liquids of different densities, such as, for example, oil and water.

More specifically, the invention is an improved gravitational separator of the type utilizing a collection tank or housing for receiving a mixture of the fluids to be gravitationally separated, the tank having a reaction member preferably in the form of either a floating dome or diaphragm element within the upper area of the tank which serves as a reaction surface against which the volume of lighter (less dense) fluid accumulated within the upper portion of the tank exerts an upward, buoyant influence.

Separators of the type utilizing a floating dome are known in the prior art, as exemplified in the British Patent Specification No. 1,212,553 to Cornelis in'tVeld published Nov. 18, 1970 and U.S. Pat. No. 3,628,660, also to in'tVeld, granted Dec. 21, 1971. In separators of this type, the mixture of lighter and heavier fluids (oil and water, generally) is admitted to the interior of the separator beneath the dome under positive pressure or is inducted therein by suction of the heavier fluid from the heavier fluid discharge pipe of the separator, with the separator being hermetically sealed. The mixture of heavier and lighter fluids gravitationally separates in the separator, with lighter fluid rising up under the dome and heavier fluid sinking to the lower part of the separator vessel beneath the dome.

The gradual accumulation of lighter fluid beneath the dome, which is counterbalanced so as to normally be slightly negatively buoyant in the heavier fluid, causes the dome to float upwardly in the heavier fluid within the separator. It is customary to sense the high limit position of the dome to produce a control signal useful to instigate valve and pump actuations which enable the removal of less dense separated fluid from beneath the dome.

Gravitational separators of this type that are used to separate oil from an oily water mixture are provided with filter or coalescer screens or elements between the lower part of the separator and the water discharge pipe to collect any lingering droplets of oil carried to the lower part of the separator. Such screens are backwashed periodically to remove the oil clinging to the coalescers and, as described in the above-referenced U.S. Pat. No. 3,628,660, such backwashing of the screens can be carried out quite efficiently during the oil discharge mode of separator operation. That is, it is customary procedure to remove the accumulated oil from beneath the floating dome by pressurizing the clean water discharge pipe of the separator to admit clean water backwards into the lower end of the separator through the coalescer screens, and into the area beneath the dome to thereby force accumulated oil out of the separator under positive pressure. Only the discharge of oil is desired, of course, and the reverse inflow of water is ceased when the accumulated oil has been discharged and the dome has sunk to its lower starting level.

Several problem areas have been encountered with the use of separators of the type just described. There has arisen, for example, a need for a simple, efficient and substantially fail-safe system to precisely counterbalance the floating dome or the diaphragm beneath which the separated oil is trapped and to accurately sense when the volume of separated oil has reached an upper limit within the separator so that removal procedures can be instigated. Such a system is disclosed and claimed in my co-pending application identified above. Also, the flow pattern of water through the coalescer screens has been found to be less than ideal both in forward and reverse flush senses. Ideally, the flow pattern in a forward direction through the coalescer screens should be uniform across all of the screens in the coalescer system and, when the screens are backflushed, the backflush flow pattern should occur entirely across the surfaces of the coalescer screens to remove oil droplets therefrom. Furthermore, the discharge of oil from between the coalescer screens should be as complete as possible during the backflush operation. Finally, it has been found to be highly desirable to prevent any accumulation of oil above the separator reaction member during the operating life of the separator, since accumulation of the less dense fluid above the member causes an inaccurate flotation response of the member to the accumulated oil beneath the dome.

Another approach to the reaction member counterbalance problem has been described in U.S. Pat. No. 3,957,638 granted May 18, 1976, and assigned to the assignee of the instant application. The description of that prior art system is incorporated herein by reference.

The present invention finds particular application in a bilge water disposal system for a vessel, such as described in U.S. Pat. No. 4,018,683, co-owned by the assignee of the present invention, and which is also intended to be incorporated herein by reference. Other applications of the present invention, of course, are envisioned in industrial installations ashore for separating mixtures of immiscible fluids of different densities.

SUMMARY OF THE INVENTION

The present invention contemplates the utilization of a system of one-way check valves in the coalescer screen assembly of the separator for ensuring efficient flow of water through the coalescer screens both in a forward and backflush mode.

Another inventive feature is the use of a particular inlet conduit arrangement for preventing undue turbulence within the incoming stream and to minimize disturbance of the separation process taking place within a separator tank, particularly within the upper portion of the tank.

In addition, this invention contemplates constructing the reaction member so that the buoyancy thereof can be more precisely regulated during its manufacture.

Still another feature of the invention is a special construction of the reaction member whereby it cooperates with the lighter fluid outflow conduit in a manner that minimizes or eliminates the adverse effects of an air bubble trapped beneath the reaction member.

Finally, the invention contemplates a special collector hood over the coalescer for collecting backflushed mixture and carrying same beneath the reaction member during each backflush operation.

The above general summary of the invention is intended to be introductory with respect to a detailed description of a specific, illustrative embodiment of the invention that is set forth below. Of course, the scope of the invention is intended to be limited solely by the claims set forth below, with the detailed description describing a preferred embodiment of the invention in accordance with statutory requirements.

DETAILED DESCRIPTION OF THE INVENTION

With reference to the attached drawings:

FIG. 1 is a schematic view of a floating dome separator system incorporating one embodiment of the improved coalescer screen system of the present invention;

FIG. 2 shows an alternate embodiment of the coalescer screen arrangement and another embodiment of the separator system used with the coalescer arrangement;

FIG. 3 is a sectional view taken along line III—III in FIG. 2; and

FIG. 4 is a detailed view of the top area of the dome in FIG. 2 shown in its upper limit position.

With reference to FIG. 1 of the drawings, a separator system for separating oil from oily water includes a separator tank 10 having an oily water mixture inlet conduit 12 that continues internally of the separator tank 10 up to an upwardly extending extremity 14 which constitutes the actual inlet for oily water mixture within the tank 10. Inlet conduit 12 includes a one-way check valve 15 at the source M of oily water mixture to be processed. A water line 16 located towards the lower end of the tank 10 serves as both a clean water discharge line and a backflush-tank pressurizing inlet line, as will be more fully explained below. Line 16 is connected to suction pump 18, through line 17, solenoid valve 19 and one-way check valve 20, the pump 18 being connected to a control panel 22 which provides a power supply for the pump and controls its operation through lead 24. The solenoid valve 19 is connected to the control panel through lead 25. Line 26 is the outlet line for clean water processed by the separator system. Conduit 16 is also connected to a clean water supply under pressure through solenoid valve 28 which is connected to control panel 22 through lead 29.

Normally, the tank or housing 10 is initially filled with water or contains oil and water undergoing separation, the valve 19 is normally opened and valve 28 is normally closed. Actuation of pump 18 then draws a suction on line 16 which, since the tank 10 is hermetically sealed, causes discharge of water through lines 16 from tank 10 and intake of oily water mixture line 12 into the tank. Since the mixture from source M is not agitated, emulsified or homogenized by a pump located between the source M and the separator tank 10, but rather quietly released at the top of the upstanding column of conduit 12 in separator 10, separation by gravity of oil and water proceeds rather rapidly within the tank 10.

A dome-type reaction member 30 loosely fits within tank 10 and may be provided with flotation chambers 32. The dome 30 will be counterbalanced to have slightly negative buoyancy in water (fresh or salt water, as the situation demands) so that with no oil whatsoever in the separator the dome rests on lower stop means 34.

Oil discharge conduit 36 extends to a position at the extremity 38 thereof within the tank 10 just beneath the inner surface of the top of the dome 30 when the dome is in its lower extreme rest position on the stop 34. The other end of conduit 36 empties into an oil storage tank 40 through one-way check valve 41. Inlet line 12 discharges at 14 in an area beneath the dome 30.

Thus, it will be evident that upon operation of pump 18 in the normal manner, oily water mixture is sucked into the tank 10 and discharged gently beneath the dome 30, with the water dropping down to the lower part of the tank and the oil rising to the upper internal area beneath the dome 30. The dome 30 will then be influenced by the buoyancy of oil trapped beneath the dome 30, which buoyancy will be a function of the relative densities of the oil and water and the volume of the oil accumulated beneath the dome. The reaction of the dome to the buoyancy force of the accumulated oil will be a tendency to float upwardly to the extent that the buoyancy force is unbalanced. If the dome 30 were floating with initial neutral buoyancy, for example, the presence of any appreciable amount of oil under the dome 30 would cause it to gradually rise to an upper limit in the tank 10. It will be readily understandable that this is not desired, since the objective of the separator system is to cyclically accumulate a certain volume of oil beneath the dome, and to discharge substantially all of this oil into a collection tank with a minimum of interruption to the overall separatory process. A balancing system for the dome is therefore desirable to enable the accumulation of a predetermined volume of oil beneath the dome and means for sensing the occurrence of such predetermined accumulation in a precise manner. Once the accumulation of a desired volume of oil has occurred, control means for the separator must sense the occurrence of this accumulation and institute control of the system to momentarily cease the inflow of oil and water mixture, pressurize the interior of the tank with water to cause the oil to be discharged from the separator and finally to return the system to its original operating mode when sufficient oil has been removed from the system.

A dome balancer system per se has been described in copending application Ser. No. 608,905, now U.S. Pat. No. 4,032,444. Upon shutting off of pump 18, and with the closure of valve 19 and opening of valve 28, water under pressure is admitted quickly into the tank 10. The check valve 15 prevents outflow through conduit 12, with the consequent result that oil is discharged through conduit 36, the only other outlet from the separator tank. The inlet of conduit 36 is located beneath the dome 30 but closely adjacent the upper surface of the dome when it is in its lowermost position. Oil will therefore be discharged through conduit 36 as the interior of tank 10 is pressurized with clean water and the dome will gradually sink as the oil is discharged from the separator, since the volume of oil causing the upward buoyant force on the dome is gradually diminished. If the inflow of fresh water through line 16 is continued indefinitely, of course the oil would all be removed, the dome 30 would settle onto its stop, and water eventually would be discharged through oil discharge conduit 36. Obviously, this condition is never intentionally allowed to occur.

Oil is indicated as 42, and water as 46. In FIG. 1, the dome is connected to the balancing and oil discharge control mechanism within upper portion 51 of the separator tank 10. A magnet 52 connected by rod 50 to the dome 30 is used to trip relays 54, 55 for transmitting appropriate signals to the control panel 22 via electrical lines 56 and 58, all as described in more detail in U.S. Pat. No. 4,032,444.

In operation, the tank 10 is initially filled with water, preferably by closing valve 19 and opening valve 28 to cause clean water to be admitted into the tank through line 16. Check valve 15 prevents outflow through inlet line 12 beyond the valve 15, but line 12 can also be closed by an appropriate shutoff valve. Line 36 is likewise closed during the filling operation. The tank 10 is hermetically sealed, with air being exhausted through an appropriate air eliminator. Suitable switches at the control panel 22 are then thrown to cause the system to operate in the automatic mode. Valve 28 is closed, valve 19 is open and lines 12 and 36 are in communication respectively with an oil and water mixture M and a storage tank 40. Operation of pump 18 can be regulated in any suitable manner, such as, for example, where mixture M is located in a bilge of a vessel, by a switch means responsive to the bilge water level, and when functioning creates a negative suction pressure in tank 10. As water is withdrawn through line 16 and discharged through line 26, oil and water mixture is drawn into the separator through line 12. In the separator, oil will float towards the underside of the dome 30, while water will gradually drop to the lower area of the tank. The volume of water displaced from beneath dome 30 will create an upward flotation force on dome 30 which force will be a function of the relative densities of the oil and water, and the mass of the volume of oil accumulated between the dome. Stated in a different manner, the force is a function of the relative densities of the oil and water and the mass of the volume of water displaced by the oil beneath the dome. Initially, upward flotation of the dome will be resisted by the downward force of the balance mechanism on shaft 50, and low dome position switch 54 will sense this condition and transmit an appropriate signal to control panel 22. As the mass of oil beneath the dome increases, the buoyance forces acting on the dome increase and, when the resistance to upward movement exerted by the balance mechanism is overcome, the dome will be allowed to rise until the high position switch 55 senses an upper limit position, at which time a signal appropriate for this condition is transmitted to control panel 22.

The high dome position, of course, is indicative of the accumulation of a predetermined volume or weight of oil beneath the dome that must be discharged from the separator periodically. Control panel 22 includes appropriate circuitry to utilize the signal transmitted by the high dome position switch 88 and to send an appropriate signal to cease operation of pump 18, close valve 19 and open valve 28. This causes further mixture input to the separator to cease, and forces fresh water under pressure into the tank 10 to cause oil to be discharged from line 36 to storage tank 40, as described above.

Outflow of oil from beneath the dome will cause it to sink towards its starting position until the low dome position switches sense a low position of the dome and control panel 22 responds to this condition. Circuitry within the panel will then return the system to its original mode of operation whereby valve 19 is opened, valve 28 is closed and operation of pump 18 is enabled. Continued operation of pump 18 will cause continued recycling of the system so long as sufficient oil accumulates beneath the dome to cause it to reach its upper flotation limit. For a suitable example of a control panel and pump control system applicable to the present invention, reference is made to the above-cited copending application of Walters et al, Ser. No. 530,539.

In FIG. 1, coalescer screens 100 (loosely referred to as filters) are provided at the lower end of tank 10, the screens being concentrically nested about a central conduit 102 which extends downwardly through the screen assembly and slightly beyond the bottom of a lower screen support plate 104. Upper screen support plate 106 along with lower plate 104 extends transversely across the tank internal dimension, and, along with the conduit 102, effectively seals the tank 10 from a filter chamber 110 which contains the screens 100 and which communicates with water outlet 16.

Flow of water into chamber 110 is through lightly loaded, pressure-responsive one-way valves 112 which allow water to be admitted to the chamber 110 from below the lower plate 104. Inflow of water to chamber 110 occurs between the duct 102 and the innermost coalescer screen 100 when pump 18 is operating. The water then passes radially outwardly through the successive screens 100 and finally out through line 16. Oil droplets that may be entrapped in the sinking water beneath the dome and not separated out in the main mass of oil 42 are caught up on the coalescer screens, which are preferably formed of an oleophobic, porous, fibrous material, woven or knitted, rough on one side and smooth on the other side, the screens being supported on a vertical metal or plastic framework. As illustrated, the screens preferably are concentric and cylindrical in form.

The screens 100 are backwashed during the oil discharge operation when the tank 10 is pressurized by incoming water through line 16. One-way valves 114 provided in the top plate 106 provide the only outlets for chamber 110, whereby, inflow of water to chamber 110 through line 16 will reverse flush the screens 100 and discharge water and backflushed oil particles from the chamber areas between the screens 100 into the tank 10 above plate 106. An oil detector 120 connected to panel 22 via lead 122 is provided within tank 10 above the screens 100 to detect excessive oil at this level of the separator. Actually, detector 120 can be located at any desired position beneath the dome 30 and above the screen support plate 106. If oil in an emulsion state with water reaches the coalescers 100, oil could be passed through the screens and into the water discharge line. Also, excessive oil at this level of the tank 10 would be indicative of a malfunction in the separator control system. If this situation is sensed at the detector probe 120, appropriate circuitry at control panel 22 will shut down the separator system and sound an appropriate alarm.

With reference to FIGS. 2, 3, and 4, another embodiment of a coalescer screen unit is shown. The concentric screens 200 are arranged vertically within a coalescer chamber 202 having top and bottom walls 204 and 206, and a sidewall 208. The chamber 202 in this embodiment is sealed from the interior of tank 10 except through pressure responsive one-way inlet valves 210 and pressure responsive one-way outlet valves 212. The chamber 202 is in communication at a bottom central area with a water conduit 214 having an enlarged area 216 where it is threadably connected at 218 to the bottom wall 204 of chamber 202. The enlarged diameter 216 is provided to cause a velocity differential of fluid flowing through conduit 214 when the fluid moves from the chamber 202 to the conduit 214, or vice versa, depending upon whether the system is operating in the suction mode or the backflush mode.

In this embodiment, water in the lower part of tank 10 from which most of the oil has been removed enters the coalescer through the lower wall 204 at the outside of the area within chamber 202 and progressively moves towards the inside water outlet conduit 214 which is centrally disposed in this embodiment, within the innermost of the coalescer screens 200. A maximum period of time is thus provided for effecting separation of oil particles from water and oil mixture flowing through the system, since the water will be required to travel to virtually the bottom of the separator tank 10 before entering the chamber 202.

Accumulated oil particles on the screens 200 and within the chamber 202 between the screens are removed by backflushing the chamber 202. Water pressure and therefore water flow is reversed through conduit 214 and valves 212 allow backflushed oil and water to exit out of chamber 202, while valves 210 prevent backflush flow out through the bottom of the chamber 202. Thus, backflushed oil is required to exit from chamber 202 through valves 212 at the upper end of the chamber.

Also in the embodiment of FIGS. 2-4, a collector hood 230 is connected to the top of chamber 202 and is sealed thereto. The hood, shaped generally like a funnel that has been inverted, includes an upwardly extending conduit portion 231 that terminates within the area encompassed by the dome reaction member 235, preferably the area just below the upper portion of the dome when the latter is at its lower position. A deflector member 236 supported by a suitable apertured spacer 238 is provided at the end of the conduit 231 of the hood 230.

The oily water mixture is supplied to tank 10 through inlet line 12 which includes a resilient section 240 and an enlarged section 242 for reducing the flow velocity of incoming mixture. Section 242 of inlet line 12, as seen in FIG. 3, narrowly clears the inner diameter of conduit 231. Thus, oily water mixture drawn into tank 10 through line 12 is transferred to conduit 213 where it moves upwardly until deflected gently laterally by deflector 236 into the separation area of the tank 10.

The oil outlet line 250 terminates within the uppermost area bounded by the dome, just beneath its upper surface portion. It also includes a resilient portion 251 to allow for slight movement between the hood 230 and the tank sidewalls.

The dome reaction member 235 is provided with a vertical flexible seal or screen 255 about its periphery which extends between the dome 235 and a deflector ring 256. Thus, oil that may separate out from the water in the lower region of the tank below the bottom edge of the dome cannot enter the space in the tank above the dome. In this embodiment, the screen 255 is non-porous, and a balance pipe 275 is provided between the upper and lower regions of the tank, such balance pipe being filled with water in the manner described in our co-pending application Ser. No. 608,905.

A bellows seal 276 is provided to further prevent oil contamination above the dome 235. Seal 255 may also be formed so that it is impermeable to oil, but permeable to water, in which case a balance pipe would not be necessary.

The dome reaction member 235 is preferably formed of resin-bonded fiberglass or the like, and is provided with a flotation collar 260 that provides the dome with sufficient buoyancy to make it effectively neutrally or slightly positively buoyant in water. The balance mechanism above the dome and associated with rod 262 (similar to shaft 50 in FIG. 1) provides the precision buoyancy adjustment required for the control system of the unit.

Dome 235 is provided with an auxiliary air trap chamber 265 that represents a volume bounded by an upper surface area of the dome 235. The volume of the air trap chamber is carefully controlled during manufacture of the dome for reasons that will be more fully explained momentarily. The auxiliary chamber 265 includes a bottom open area that is considerably smaller (less than half) than the total area of the underside of the dome that is reacted upon by the lighter fluid (oil in this example) collected beneath the dome.

The upper extremity of oil outlet duct 250 normally extends into the air trap chamber 265 when the dome is below its normal upper limit position as seen in FIG. 2, but lies approximately at the level shown in FIG. 4 when the dome is at its normal upper limit of travel.

With the dome in its upper limit position as shown in FIG. 4, the separator normally would shift over to the oil discharge mode of operation, and therefore the separator would be pressurized with backflush water through conduit 214.

Any air trapped beneath the reaction member would then collect in the air trap chamber 265 and the chamber is dimensioned so that when there is enough air collected to position the reaction member in the upper limit position the upper surface of the oil layer is approximately level with or below the upper opening in the oil discharge conduit 250. The air trap chamber overcomes a problem in prior art separators of the instant type that arises due to an effective air lock condition that occurs beneath the upper surface of the reaction member that is reacted against by the lighter fluid.

When a relatively flat or slightly arcuate upper reactor surface is used, as shown in FIG. 1, for example, air that accumulates beneath the reaction member gathers in the form of a bubble. Due to the relatively small volume of air required to displace liquid and thus to cause the reactor to rise to its upper limit and the large surface area over which the air is spread, the air-liquid interface is above the upper opening in the oil discharge conduit 250. Thus, when the system is cycling on air alone or a mixture of air, water and oil, a quantity of liquid is discharged during each cycle. Eventually the minimum desired residual oil layer that is intended to be preserved beneath the reaction member to make the balance system operate properly will be discharged.

The air trap chamber 265 effectively prevents loss of minimum desired oil layer thickness beneath the reaction member while the air is being discharged, and allows a volume of air to be compressed above the oil layer and in communication with the oil discharge conduit. Even if the system recycles rapidly on air alone, the top of the conduit 250 remains at or above the upper level of the minimum desired oil layer that is to be preserved beneath the reaction member.

The term "reaction member" is not intended to be limited solely to a dome such as illustrated herein. It applies equally well, and is intended to encompass, a planar diaphragm member as well as an arcuate, flexible diaphragm.

The above description is intended to be exemplary of preferred embodiments of the present invention; modifications of these embodiments and different arrangements of specific structure falling within the scope of the appended claims are intended to be encompassed by this patent.

What is claimed is:

1. In a gravitational oil and water separator utilizing at least one coalescer screen within the lower area of the separator for trapping oil particles entrained in a clean water discharge flow from the separator, the water discharge from the separator occurring normally by suction of water from the separator and the screen normally being backflushed by a reverse flow of water through the screen under pressure, the separator including a water discharge outlet and backflush inlet means at the lower portion of the separator, the improvement comprising a chamber within the separator for containing the coalescer screen, the chamber being isolated from the interior of said separator except through pressure responsive one-way valve elements, at least one inlet pressure responsive one-way valve for permitting flow of water into the chamber only, and at least one pressure responsive one-way outlet valve for permitting flow of water out of the chamber only, the water discharge outlet and backflush inlet of the separator communicating with the interior of the chamber, the inlet one-way valve being located towards the lower end of the chamber and the outlet one-way valve being located at an upper end of the chamber; at least one coalescer screen in the chamber disposed entirely across the chamber with the water discharge outlet and backflush inlet means being located towards one side of the screen and said inlet and outlet valves being located towards the opposite side of the screen, whereby flow of water into the chamber during normal separator operation enters at the lower space of the chamber through the pressure responsive one-way inlet valve and backflush flow out of the chamber occurs at the upper extremity of the chamber during the backflush operation of the separator through the pressure responsive one-way outlet valve to thereby ensure the discharge of backflushed oil out of the upper area of the chamber.

2. The separator recited in claim 1, wherein the coalescer screen chamber is located centrally in the lower area of the separator and includes top and bottom walls extending substantially horizontally across the interior of the separator, and further including a duct extending generally vertically through the coalescer screen chamber and through the top and bottom walls thereof, the duct being in communication with the interior of the separator but not with the interior of the chamber, whereby the flow of water towards the chamber inlet one-way valve from the separator is from below the chamber, through said duct.

3. The separator recited in claim 1, wherein multiple, concentric, annular coalescer screens are provided in the chamber and extend across the chamber from top to bottom thereof in radially spaced relationship, whereby spaces are left between the coalescer screens within the chamber; and further wherein a separate pressure responsive outlet one-way valve is provided for each of the spaces within the chamber between the coalescer screens, the outlet one-way valves being located at the upper extremity of each of the spaces between the screens within the chamber.

4. The separator recited in claim 3, further wherein said chamber is provided with upper and lower walls extending transversely across the interior of the separator housing, a central duct extending generally vertically through the housing, the duct being in communication with the interior of the separator but not in communication with the interior of the chamber, and wherein said central duct extends from the upper chamber wall to a space slightly below the lower chamber wall; openings in said upper chamber walls being located between the coalescer screen elements; an opening in the lower chamber wall between the duct and the radially innermost coalescer screen element; each of said outlet one-way valves communicating with a respective one of said openings in the upper chamber wall; said inlet one-way valve communicating with the said opening in the lower chamber wall.

5. The separator recited in claim 1, wherein the one-way inlet valve is located near the outer periphery of the coalescer chamber and the water discharge outlet and backflush inlet means are located centrally of the said chamber.

6. The separator recited in claim 5, wherein the coalescer chamber is threadably secured to an upstanding end of the water discharge outlet means.

7. The separator of claim 1, including a collector hood connected to the upper end of the coalescer chamber, the hood enclosing a volume including at least each of the outlet one-way valves, and the hood including an upwardly extending conduit portion terminating in the upper region of the separator.

8. The separator of claim 7, including a fluid deflector means near the upper extremity of said upwardly extending hood conduit.

9. The separator of claim 7, including a mixture inlet line for oil and water mixture to be gravitationally separated, the inlet line terminating within the collector hood.

10. The separator recited in claim 9, wherein said oil/water mixture inlet line terminates within the upwardly extending conduit portion of said hood.

11. The separator recited in claim 10, wherein the outlet end area of the mixture inlet conduit is larger than the adjacent inlet conduit, and further wherein said outlet end extends coaxially within the hood conduit and in close proximity to the peripheral inner diameter of the latter.

12. The separator recited in claim 7, including a movable reaction member having a generally horizontally disposed surface beneath which separated oil collects, the reaction member having upper and lower normal limit positions of movement, the upwardly extending hood conduit terminating adjacent to and beneath the said surface when the latter is at its normal lowermost limit position.

13. The separator recited in claim 12, wherein said reaction member is formed to provide an upwardly extending auxiliary chamber beneath the reaction member, and an outlet conduit for oil terminating within the separator with said auxiliary chamber when the reaction member is at its normal lower limit position, said auxiliary chamber being formed with an open bottom area that is substantially smaller than the area of the reaction member against which the accumulated oil reacts.

14. The separator recited in claim 7, including a reaction member therein which is freely supported for vertical motion between upper and lower limit positions within the upper portion of the separator, separation of oil from water occurring entirely beneath the reaction member, with separated and collected oil displacing water beneath the reaction member and tending to lift the reaction member within the mass of water, the upper end of the hood conduit terminating beneath and adjacent to that portion of the reaction member that is reacted against by the accumulated oil.

15. In a gravitational separator for immiscible liquids of different densities, including a tank within which a movable reaction member is freely supported for vertical motion between upper and lower limit positions, separation between the fluids occurring totally beneath the reaction member, with separated and collected lighter fluid displacing the heavier fluid beneath the reaction member and tending to lift the reaction member against a displaced mass of heavier fluid, the improvement comprising, said reaction member including a portion enclosing an auxiliary chamber on all sides except a bottom area which is open towards the lower interior of the separation tank, and an outlet conduit for lighter fluid normally stationary relative to said reaction member and separate from said reaction member extending upwardly into and terminating within the auxiliary chamber when the reaction member is disposed at its lowermost limit position, said bottom area being less than half the area of the reaction member that is reacted against by the separated lighter fluid.

16. The separator recited in claim 15, wherein said reaction member is a generally dome-shaped, thin walled element, and said auxiliary chamber forms an upward extension of the central uppermost wall area of the dome element.

17. In a gravitational separator for immiscible fluids of different densities, including a closed tank within which a movable reaction member is totally and freely supported for vertical motion, separation between the fluids occurring totally beneath the reaction member, but separated and collected lighter fluid displacing the heavier fluid beneath the reaction member and tending to lift the reaction member against a displaced mass of heavier fluid, the improvement comprising a vertically compliant flexible seal extending vertically between the periphery of the area of the reaction member reacted upon by the accumulated lighter fluid and a fixed portion of the tank, said seal being impermeable to lighter fluid within the tank, and dividing the tank interior into two upper and lower separate volumes, said reaction member and seal being adapted to be immersed in fluid within said volumes during operation of separator; and means providing fluid pressure communication between the volumes.

18. The separator recited in claim 17, wherein the reaction member is generally shaped like a thin-walled dome, and the seal extends vertically from the lower periphery of the dome.

19. The separator recited in claim 17, wherein said fixed portion of the tank is a radially inwardly extending deflector element within the tank, said deflector element extending radially inwardly at least to the peripheral area of the reaction member against which the accumulated lighter fluid reacts.

* * * * *